No. 886,813. PATENTED MAY 5, 1908.
D. R. JONES.
PLASTERING MATERIAL.
APPLICATION FILED MAY 9, 1906.

Witnesses
M. C. Lyddane

Inventor
David R. Jones
By W. J. Fitzgerald
Attorney

UNITED STATES PATENT OFFICE.

DAVID R. JONES, OF ATCHISON, KANSAS.

PLASTERING MATERIAL.

No. 886,813.

Specification of Letters Patent.

Patented May 5, 1908.

Application filed May 9, 1906. Serial No. 315,956.

*To all whom it may concern:*

Be it known that I, DAVID R. JONES, citizen of the United States, residing at Atchison, in the county of Atchison and State of Kansas, have invented certain new and useful Improvements in Plastering Material; and I do hereby declare the following to be a full, clear, and exact description of the invention, such as will enable others skilled in the art to which it appertains to make and use the same.

My invention relates to new and useful improvements in plastering material and my object is to prepare said material and mold the same into blocks so that it can be applied directly to the studding of the building without the use of laths.

A further object is to provide reinforcing means for said plastic blocks.

Other objects and advantages will be hereinafter made clearly apparent in the specification and pointed out in the claims.

Figure 1:
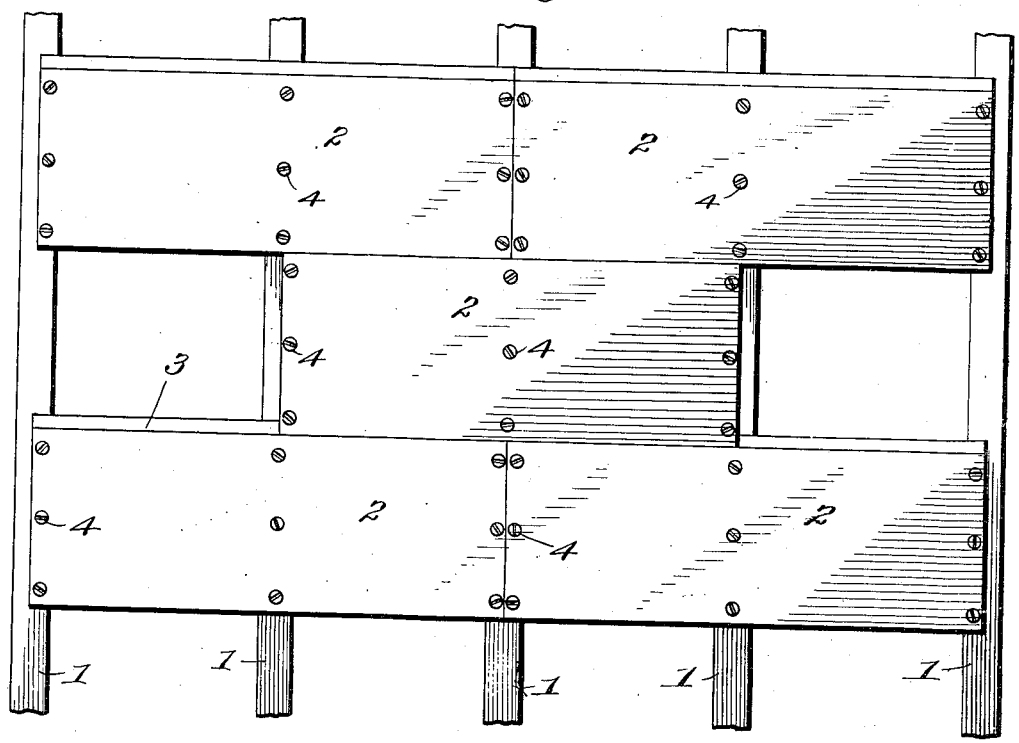
Figure 2:

In the accompanying drawings I have shown the preferred forms of my invention. In said drawings—Figure 1 is a plan view of a plurality of studding showing sections of my improved plastering blocks secured thereto; and Fig. 2 is a sectional view through one of the blocks.

Referring to the figures by numerals of reference, 1 indicates studding such as is employed in buildings to which I secure plastic blocks 2, said blocks being preferably molded in strips of sufficient length to reach into engagement with three of the studding. The material used in making my improved plaster is preferably composed of plaster of Paris, cement or any other like substance and is combined with hair, wood fiber, saw dust, wool, wood shavings, excelsior, straw or other like substances.

The blocks are preferably reinforced with strips of burlap or other like material, said burlap being placed between layers of the plastering material while the same is in a green state so that said plastering material will commingle with and adhere to said burlap before drying. The edges of the blocks 2 are preferably stepped as at 3 the inner faces of said stepped portions being covered with the burlap so that when the blocks are being secured to the studding, the stepped edges thereof will overlap each other, thereby reinforcing the meeting edges of said blocks and at the same time producing substantially a continuous surface.

After the blocks of plastering are placed in position upon the studding, they are secured thereto by means of screws or the like 4 after which said blocks may be covered with wall paper or other material as preferred.

By this construction it will be seen that I have provided a prepared plastering of such character that the blocks thereof may be secured to the studding by any one whether skilled in the art of plastering or not.

What I claim is:—

An article of manufacture comprising blocks formed of alternate layers of plastic material and reinforcing strips of fabric, said fabric being molded between layers of plastic material while said material is in a green state, said blocks being stepped at opposite edges and having one of said strips of fabric so disposed between said layers of plastic material that it will cover the inner faces of said stepped portions.

In testimony whereof I have signed my name to this specification in the presence of two subscribing witnesses.

DAVID R. JONES.

Witnesses:
ASA W. THOMPSON,
JOHN K. FISHER.